United States Patent
Miller

(10) Patent No.: US 7,655,898 B2
(45) Date of Patent: Feb. 2, 2010

(54) OPTICAL FILTER ASSEMBLY WITH SELECTABLE BANDWIDTH AND REJECTION

(75) Inventor: Peter Miller, Cambridge, MA (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 0 days.

(21) Appl. No.: 11/899,293

(22) Filed: Sep. 5, 2007

(65) Prior Publication Data

US 2008/0144177 A1 Jun. 19, 2008

Related U.S. Application Data

(60) Provisional application No. 60/861,889, filed on Nov. 30, 2006, provisional application No. 60/937,510, filed on Jun. 28, 2007.

(51) Int. Cl.
*G02F 1/01* (2006.01)

(52) U.S. Cl. .................. 250/225; 349/18; 356/365; 359/322

(58) Field of Classification Search ............ 250/225; 349/104–111, 18, 99, 61, 75, 119; 359/250, 359/252, 245, 437, 322; 356/364–370; 348/E5.133, 348/E5.141
See application file for complete search history.

(56) References Cited

U.S. PATENT DOCUMENTS

| | | | |
|---|---|---|---|
| 5,231,521 A * | 7/1993 | Johnson et al. | 349/18 |
| 5,658,490 A * | 8/1997 | Sharp et al. | 252/299.01 |
| 5,751,384 A * | 5/1998 | Sharp | 349/18 |
| 5,892,612 A | 4/1999 | Miller et al. | |
| 5,990,996 A | 11/1999 | Sharp | |
| 6,421,131 B1 * | 7/2002 | Miller | 356/453 |

OTHER PUBLICATIONS

A. Yariv and P. Yeh, Wiley, Optical Waves in Crystals, Ch. 5, pp. 121-154 (1984).

* cited by examiner

*Primary Examiner*—Thanh X Luu
*Assistant Examiner*—Francis M Legasse, Jr.
(74) *Attorney, Agent, or Firm*—Cohen Pontani Lieberman & Pavane LLP

(57) ABSTRACT

An optical filter assembly having selectable bandwidth is presented. The optical filter assembly includes a first optical filter, a first optical retarder with optical retardance R1, a second optical retarder with optical retardance R2, a polarization switch positioned between the first and second retarders which causes their retardances to substantially add in a first switch setting and to substantially subtract in a second switch setting, and an exit polarizer. A multispectral imaging system using tunable optical filters having selectable bandwidth is presented. A method of filtering light is also presented. The method includes providing a first optical filter, providing a dynamic bandwidth stage including a polarization switch, selecting a first setting of the polarization switch, and producing a first filter action for light passing through the first filter and the dynamic bandwidth stage.

25 Claims, 9 Drawing Sheets

OPTICAL FILTER ASSEMBLY WITH SELECTABLE BANDWIDTH AND REJECTION

CROSS REFERENCE TO RELATED CASES

This application claims priority to, and the benefit of, U.S. Provisional Patent Application Ser. No. 60/861,889, filed Nov. 30, 2006 and U.S. Provisional Patent Application Ser. No. 60/937,510, filed Jun. 28, 2007, the entirety of which is incorporated herein by reference.

BACKGROUND OF THE INVENTION

1. Field of the Invention

The present invention relates generally to optical filters, and more particularly to an optical filter assembly having selectable bandwidth, and to multispectral imaging systems using such filters.

2. Description of the Related Art

Birefringent filters such as the Lyot, Evans, and Solc designs are used as imaging spectral filters. These filters typically comprise several filter stages placed in optical sequence to produce an overall filter response having a desired free spectral range (FSR) and full-width at half maximum (FWHM). Tunable birefringent filters have been built using liquid crystal elements so that the center wavelength of the pass-band can be dynamically selected from within a tuning range that can be many times the filter's FWHM. Often, the tuning range is substantially the same as the filter's FSR. Tunable filters are used for multi-spectral imaging in applications such as the life sciences, remote sensing, and materials analysis, for example.

Birefringent filters that are selectable between an all-pass (white) state and an optically filtering state have been described by Miller in U.S. Pat. No. 5,892,612, and by Sharp in U.S. Pat. No. 5,990,996.

Multispectral imaging systems based on tunable birefringent filters are sold commercially by Cambridge Research & Instrumentation, Inc (Woburn, Mass.). These have a bandwidth which is determined by the birefringent filter design, and cannot be dynamically changed. For example, the Nuance VIS-20 has a bandwidth of 20 nm when it is tuned to 550 nm, and this bandwidth is approximately constant (in wavenumbers) as the system is tuned to different wavelengths over its 420-700 nm operating range. This system uses a filter with the Lyot design, but the pass wavelength is tunable because the retarder elements incorporate liquid crystal variable waveplates as tuning elements. Another model, the Nuance VIS-FL, uses a filter whose narrowest stage incorporates 3 tunable birefringent elements, to produce a passband which is a $5^{th}$ order approximation to a flat-topped square passband. Its bandwidth is fixed by design, and is approximately constant (in wavenumbers) as the system is tuned to different wavelengths over its 420-700 nm range. Other models, such as the Nuance NIR-20 or the Nuance GNIR, are similar but operate in the infrared range at wavelengths up to 1050 nm.

SUMMARY OF THE INVENTION

In one aspect, the invention involves an optical filter assembly having selectable bandwidth. The filter assembly includes a first optical filter, a first optical retarder with optical retardance R1, a second optical retarder with optical retardance R2, a polarization switch positioned between the first and second retarders, which cause their retardances to substantially add in a first switch setting and to substantially subtract in a second switch setting, and an exit polarizer.

In one embodiment, the first optical filter includes one or more Lyot stages. In another embodiment, the first optical filter includes one or more Solc stages. In another embodiment, the first optical filter has a tunable pass wavelength. In still another embodiment, the filter assembly further includes a tuning element adjacent to one of the optical retarders, which selects a wavelength of light to be maximally transmitted through the exit polarizer. Moreover, the first optical filter is tunable, and the first optical filter and the tuning element are tuned synchronously to yield a tunable pass wavelength in the overall assembly. In yet another embodiment, the filter assembly has a bandpass for which the FWHM differs according to the switch setting. In another embodiment, the filter assembly has a bandpass for which the FWHM is substantially unaffected by the switch setting. The filter has an extinction of out-of-band light which is affected by the switch setting.

In another aspect, the invention involves a method of filtering light. The method includes providing a first optical filter, providing a dynamic bandwidth stage that includes a polarization switch, selecting a first setting of the polarization switch, and producing a first filter action for light passing through the first filter and the dynamic bandwidth stage.

In one embodiment, the method further includes selecting a second setting of the polarization switch and obtaining a second filter action. In another embodiment, the first and second filter actions both have a passband and a stopband. In some embodiments, the widths of the passband of the first and second filter actions are different, and in other embodiments, the widths of the passband of the first and second filter actions are substantially the same and the stopband responses differ. In still another embodiment, the first optical filter includes one or more Lyot stages. In yet another embodiment, the first optical filter includes one or more Solc stages. In another embodiment, the first optical filter includes one or more generalized birefringence filter stages. In still other embodiments, the method includes providing a tuning element for the dynamic bandwidth stage, and adjusting the tuning element to transmit light of a first selected wavelength. In yet another embodiment, the method includes selecting a second setting of the polarization switch and obtaining a second filter action. In another embodiment, the method includes tuning the first filter to transmit light of a second selected wavelength, with the first wavelength and second wavelength being substantially the same.

In another aspect, the invention provides for a filter with dynamic bandwidth through incorporation of one or more stages which can be rendered optically absent. Such an absentee stage can be made by placing a polarizer, a polarization switch, a retarder, an optional tuning element, and a second polarization switch, in optical series. The polarization switches have at least two settings. In one setting they transform the polarization state of light so it is substantially an eigenstate for the retarder, and it is transformed from this eigenstate back to be substantially that of the next stage (typically, a linear polarizer). As a result, the retarder has no spectral action. In another setting of the polarization switches, the polarization state of light transiting the retarder is not transformed into and out of its eigenstate so the retarder provides a spectral action.

In another aspect, the invention is a complete multispectral imaging system including a tunable filter having a selectable bandwidth, an imaging detector such as a CCD or CMOS sensor which images light that has passed through the filter, and control electronics which tune the filter and/or vary its bandwidth dynamically.

In yet another aspect, the invention is a method of operating a system that includes a tunable filter with selectable bandwidth, an imaging detector, and control electronics which provide signals to tune the filter and select its bandwidth, wherein the filter is tuned to two or more wavelengths, and images of a scene are captured at each of these wavelengths. In a related aspect, the invention is a method of operating a system wherein the bandwidth is not the same for all the images obtained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters refer to the same parts throughout the different views. Further, the drawings are not necessarily to scale.

DETAILED DESCRIPTION OF THE PRESENTLY PREFERRED EMBODIMENTS

Figure 1:
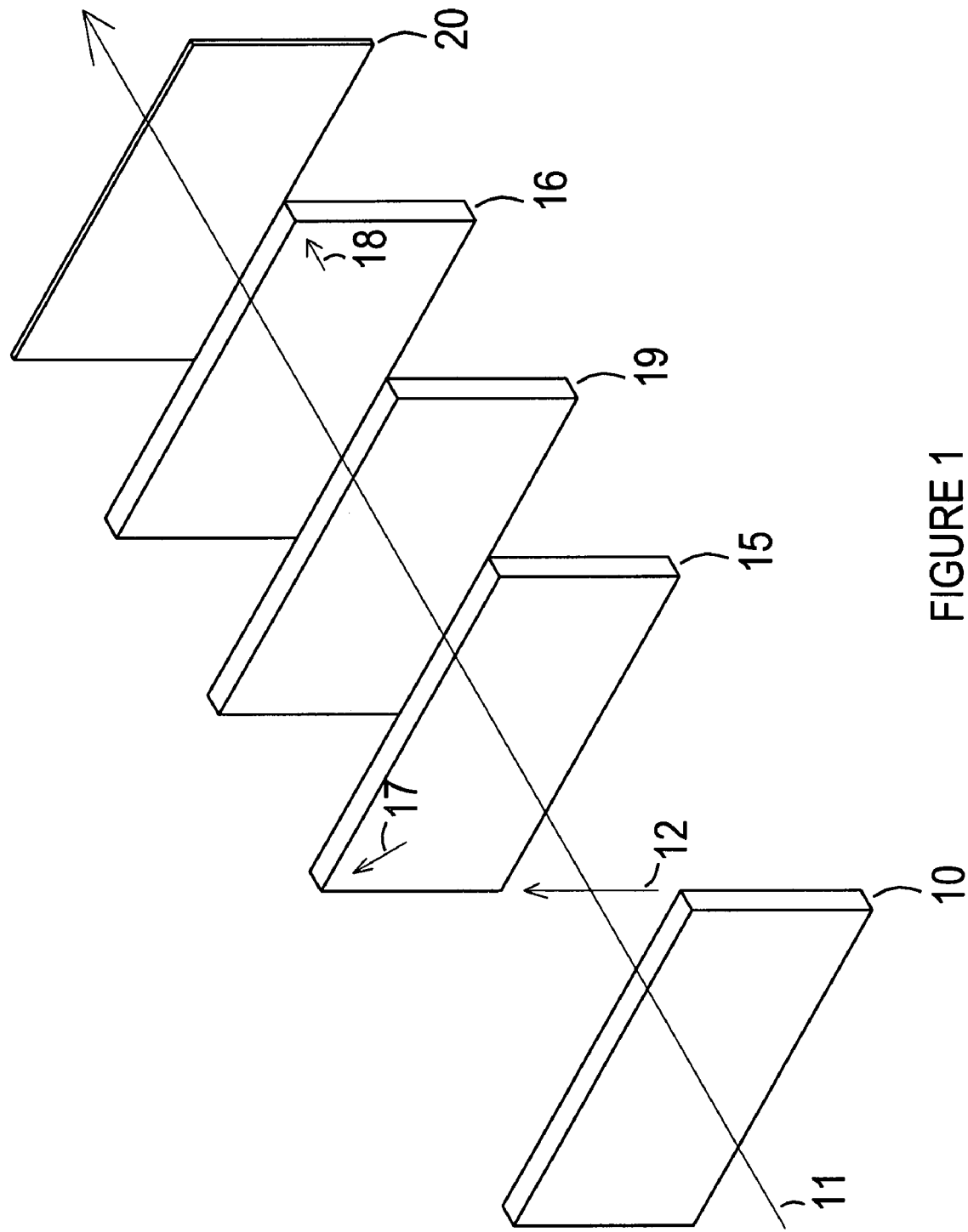
FIG. 1 is an illustrative block diagram of a single dynamic bandwidth stage having a selectable FSR and FWHM, according to one embodiment of the invention.

The present invention provides birefringent filter stages that have a selectable pass bandwidth. In one aspect, one filter stage is dynamically configurable between two states so that the filter stage's full-width at half maximum (FWHM) and free spectral range (FSR) are switchable between two significantly different sets of values. In one of the two states, a filter stage provides a narrower bandwidth, and in the other state, the filter stage provides a broader bandwidth. Such birefringent filter stages are termed "dynamic bandwidth stages".

A preferred embodiment of the dynamic bandwidth stage is a birefringent filter stage that employs a polarization switch situated between two retarders. The polarization switch allows the optical retardance of the retarders to be selectably added or subtracted based on the setting of the polarization switch. The filter bandwidth and free-spectral range are changed accordingly, affording dynamic control of the bandwidth for that filter stage.

An alternative embodiment of the dynamic bandwidth stage is a so-called absentee stage where polarization switches surround a network of one or more retarders. In a first setting, these switches transform the light incident upon the retarder network to be substantially a polarization eigenstate for the network, and the stage does not have a spectral filtering action. In a second setting, these switches have a different polarization action, so that light passing through the retarder is a mixture, often an equal mixture, of two orthogonal eigenstates for at least one retarder in the network, and the stage has a spectral filtering action. In the former switch state, the stage is an absentee, since it does not contribute to an overall filtering action. In the latter switch state, the stage provides an optical filtering action.

One embodiment of the invention includes a birefringent filter that incorporates a dynamic bandwidth stage as its spectrally narrowest stage. The FWHM of the overall filter is markedly changed when the dynamic bandwidth stage is switched from one state to the other state. Often, the FSR of the overall filter is not changed despite the reconfiguration (switching from one state to another) because the FSR may be determined by another, spectrally broader stage, or is set by the spectral limitation of the components used, such as polarizers or band-limiting filter coatings.

The invention further provides for birefringent filter stages with a dynamically tunable center wavelength, as well as dynamic bandwidth. In one embodiment of the invention, a filter stage incorporates one or more dynamic bandwidth stages, which are designed so that, in their spectrally broader state, they provide improved blocking, and reduced out-of-band rejection in a selected portion of the spectrum.

For example, in some visible-range filters, it is desirable to have a spectrally broader response when tuned to the blue or violet range, and when so tuned, offer improved blocking of longer wavelengths such as red or near-infrared wavelengths. This can be desirable because the output signal of common light sources such as quartz-tungsten halogen (QTH) lamps is dominated by red and near-IR light, and is weak in violet light. Further, the pass bandwidth of a birefringent filter varies as the filter is tuned across the filter's passband range to different wavelengths $\lambda_p$. Except for dispersion effects, the bandwidth (in nanometers) varies as $\lambda_p^2$. Because of the energy distribution of the source spectrum and because of the filter bandwidth variation with tuning, signal levels can be low when the filter is tuned to the blue portion of its range. This dynamic bandwidth selection provided by the invention reduces the disparity between the signal levels obtained in the blue region of the spectrum and the signal levels obtained in the red region of the spectrum. The same principle can be employed for filters that operate in other regions of the optical spectrum as well.

Dynamic bandwidth stages can be combined with other birefringent filter stages, which may have a tunable or fixed center wavelength. The dynamic bandwidth stages can be combined with other types of fixed filters, such as interference filters.

Referring to FIG. 1, in one embodiment a single dynamic bandwidth stage 5 having a selectable FSR and FWHM is shown. A light beam 11 (i.e., optical radiation of any spectral range of interest, including the ultraviolet, visible, and infrared ranges) passes through a first optical filter element 10 which transmits light to the rest of the elements according to a selected transmission characteristic. Filter element 10 may be an interference filter, one or more Lyot stages; one or more Solc stages; one or more birefringent filter stages; or another kind of optical filter. In one embodiment, it defines a fixed bandwidth. In another embodiment, it is a tunable filter.

Beam 11 is polarized with a polarization vector oriented along the direction shown by arrow 12. This polarization is due to a polarizer located within the first optical filter, or located elsewhere in the overall optical system in which the invention is practiced. Alternatively, the beam 11 may be inherently polarized due to the nature of the light source involved. Beam 11 is incident upon a fixed retarder 15, which has its slow axis oriented along the direction shown by arrow 17. The light beam 11 then passes through a polarization switch 19 and a fixed retarder 16, which has its slow axis oriented along the direction shown by arrow 18. The light beam 11 then passes through an exit polarizer 20 (i.e., a linear polarizer, including without limitation dichroic, wire-grid, reflective, multiple-plate, crystalline, and cube types), which analyzes the state of polarization of the light beam to produce an overall filter effect.

A retarder, in general, refers to an optical retarder such as a layer of birefringent material, including without limitation quartz, calcite, lithium niobate, yttrium vanadate, mica, stretched polymers, sapphire, beta barium borate, Mylar, liquid crystals, and liquid crystal polymers. Polymer retarders can be purchased from Meadowlark Optics (Longmont, Colo.), and crystal retarders can be fabricated using standard optical techniques from the raw optical-grade crystals.

The fixed retarder 15 is an optical retarder made of a 0.450 mm thick layer of X-cut quartz, and the fixed retarder 16 is an optical retarder made of a 0.571 mm thick layer of X-cut quartz. The slow axis (shown by arrow 18) of the retarder 16 is orthogonal to the slow axis (shown by arrow 17) of the retarder 15.

The polarization switch 19 preferably has no moving parts, and uses one or more electro-optic devices such as liquid crystal cells to perform the dynamic change of switch state (i.e., select which configuration of FSR and FWHM is active). For example, in one embodiment, the polarization switch 19 is a nematic liquid crystal variable retarder with its slow axis at 45 degrees to the slow axis (shown by arrow 18) of the retarder 16. To select the broad FSR setting, a drive voltage is applied to the polarization switch 19 to cause the polarization switch 19 to exhibit a retardance of approximately zero. To select the narrow FSR setting, a drive voltage is applied to the polarization switch 19 to cause the polarization switch 19 to exhibit a retardance of approximately one-half wavelength of the wavelength being transmitted.

In some embodiments, the liquid crystal cells can be variable-retardance, pi-cell, electrically controlled birefringence (ECB), or other types, for example. The liquid crystal cells can be made in accordance with the art of liquid crystal cell fabrication, and are commercially available from Meadowlark Optics (Longmont, Colo.).

As described above, for one setting of the polarization switch 19, the arrangement of the retarders 15, 16, and the polarization switch 19 produces an action that is similar to the retarder 15 and the retarder 16 being added together. For the other setting of the polarization switch 19, the polarization switch 19 produces an action that is similar to the retarder 15 being subtracted from the retarder 16 (or vice versa). For example, if the retardance of the first and second retarders is $R_1$ and $R_2$, respectively, the two switch settings produce an action comparable to retarders of approximately $R_1+R_2$, and $R_1-R_2$. Thus, one setting yields a larger amount of retardance than the other setting. The configuration corresponding to $R_1+R_2$ is referred to as the narrow setting of the filter stage, and the configuration corresponding to $R_1-R_2$ is referred to as the broad setting of the filter stage. This is because the optical actions of the filter stage are spectrally narrow and spectrally broad, respectively.

The FSR of a birefringent filter stage having a retardance of R is determined by the following equation:

$$FSR \cong \lambda/N \cong \lambda/(R/\lambda) \cong \lambda^2/R \qquad \text{(Eq. 1),}$$

where $\lambda$ is the wavelength at which the FSR is being evaluated, and N is the retarder's order at wavelength $\lambda$. This approximation holds true when N>>1, which is often a case of interest. In the case where N is small, the wavelengths for which the retarder expresses adjacent integral orders for N and N+1, or N−1 must be determined, and the FSR is explicitly determined by taking differences.

In the N>>1 approximation, the FWHM for a Lyot filter stage is FSR/2, and the FWHM for a Solc filter stage is FSR/M, where M depends on the number of retarders in the Solc stage. Hence, in all cases, the FSR affects the FWHM proportionally.

In one embodiment, in operation, the effective retardance of the assembly shown in FIG. 1 is changed between $R_1+R_2$ and $R_1-R_2$ by applying appropriate voltages to the polarization switch 19. This, in turn, changes the FSR and the FWHM of the filter stage that includes the polarization switch 19. Based on the above-described features of the dynamic bandwidth stage 5, filters with a variety of performance characteristics can be constructed using methods known to those skilled in the art.

Figure 2:
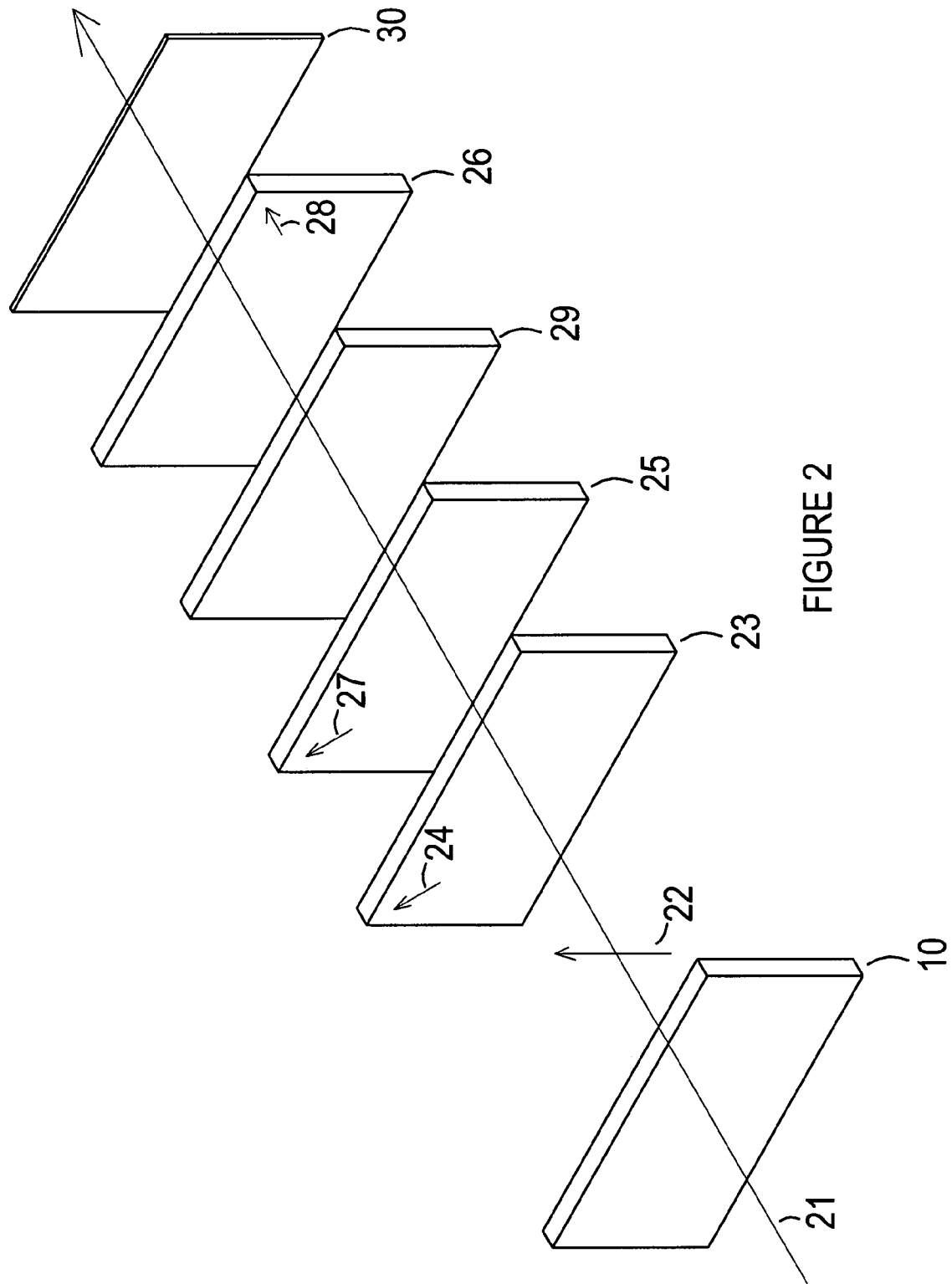
FIG. 2 is an illustrative block diagram of a single tunable dynamic bandwidth stage having a selectable FSR and FWHM and a tunable pass wavelength, according to one embodiment of the invention.

Referring to FIG. 2, in another embodiment, a single tunable dynamic bandwidth stage 6 having a selectable FSR, a selectable FWHM, and a tunable passband wavelength is shown. The dynamic bandwidth stage 31 includes fixed retarders 25 and 26, polarization switch 29, and exit polarizer 30.

The dynamic bandwidth stage 6 also includes a tuning element, which is an electro-optical device with no moving parts, such as liquid crystal cell or assembly. For example, a nematic liquid crystal cell can be used as a tuning element. An electrically variable retarder (e.g., a variable retarder 23) is placed adjacent to one of the retarders (e.g., retarder 25), with the variable optical axis of the variable retarder 23 aligned substantially with the retarder 25 axes (shown by arrow 27).

The fixed retarder 25 is a retarder made of a 0.450 mm thick layer of X-cut quartz, and fixed retarder 26 is a retarder made of a 0.571 mm thick layer of X-cut quartz. The slow axis (shown by arrow 28) of retarder 26 is orthogonal to slow axis (shown by arrow 27) of the retarder 25. The polarization switch 29 is a nematic liquid crystal variable retarder with its slow axis at 45 degrees to the slow axis (shown by arrow 28) of the retarder 26.

A light beam 21 with its polarization vector oriented along a direction shown by arrow 22 is incident upon the variable retarder 23 with its slow axis oriented along a direction shown by arrow 24. The fixed retarders 25 and 26 have their slow axes oriented along directions shown by arrows 27 and 28, respectively. The variable retarder 23 is used to tune the pass wavelength, as its retardance sums algebraically with that of adjacent retarder element 25.

To select the broad FSR setting, a drive voltage is applied to the polarization switch 29 to cause the polarization switch 29 to exhibit a retardance of approximately zero, or more generally $N\lambda$. To select the narrow FSR setting, a drive voltage is applied to the polarization switch 29 to cause the polarization switch 29 to exhibit a retardance of approximately one-half wavelength of the wavelength being transmitted. Finally, the exit polarizer 30 analyzes the state of polarization of the light beam to produce an overall filter effect.

In other embodiments, other configurations can be used for tuning the dynamic bandwidth stage. For example, ferroelectric liquid crystal cells or combinations of ferroelectric liquid crystal cells with fixed waveplates can be used. Tuning can be continuous, as in the case of a nematic variable retarder. Tuning can also be discrete, as in the case where a ferroelectric liquid crystal cell with two states is used to effect filter tuning.

Any tuning element used in the field of liquid crystal tunable filters may be used, including, without limitation, nematic variable retarders, pi cells, ECB cells, and ferroelectric liquid crystal cells. In choosing the tuning element for a given application, factors such as response time, need for discrete vs. continuous tuning, and optical quality, may all be important considerations.

In some embodiments, the polarization switch 29 can be a variable retarder, which has its fast or slow axis aligned at 45 degrees to the slow axis of the first of the two retarders (e.g., retarder 25). To select the broad FSR setting, a drive voltage is applied to the polarization switch 29 to cause the polarization switch 29 to exhibit a retardance of approximately zero, or more generally $N\lambda$. To select the narrow FSR setting, a drive voltage is applied to the polarization switch 29 to cause the polarization switch 29 to exhibit a retardance of approximately $(N+\frac{1}{2})\lambda$ wavelength of the wavelength being transmitted.

In still another embodiment, a waveplate (i.e., a retarder which has a relatively low retardance of typically two wavelengths of light or less) that switches its crystal axis orientation between two angular settings is used as the polarization switch 29. The waveplate employed has approximately a $\lambda/2$ retardance, and its two angular settings correspond to having its slow axis substantially parallel to, and at substantially 45 degrees to, one of the principal axes the retarder 25. When the waveplate is arranged with its slow axis parallel to one of the retarder axes, the waveplate either increases or decreases its retardance by $\lambda/2$, according to whether the waveplate slow axis is oriented parallel to the retarder slow axis or retarder fast axis, respectively.

Either of the above-described types of polarization switches has the effect that the two retarders 25 and 26 can be made to add together or subtract from one another, so as to produce a net retardance that is comparable to a retarder having retardance of $R_1+R_2$ or $R_1-R_2$, depending on how the polarization switch is set. The polarization switch action and its interaction with the two retarders can be modeled using Jones calculus and other tools of polarization analysis, such as described in "Optical Waves in Crystals" by A. Yariv and P. Yeh, Chap. 5, pages 121-154, Wiley (1984).

When the polarization switch 29 provides a retardance of $(N+\frac{1}{2})\lambda$ at substantially 45 degrees to the axes of the retarder 25, the effect is that the retarder 26 behaves as if its fast and slow axes are interchanged, compared to the effect that would be obtained if the switch were absent.

For example, if the retarder 25 and the retarder 26 have their fast axes parallel, then with the polarization switch 29 set as described above, the net retardance will be $R_1-R_2$. If the polarization switch 29 is set to its other state, the net retardance will be $R_1+R_2$. This is the switch state corresponding to a variable retarder with substantially 0 or $N\lambda$ retardance; or a retardance of $\lambda/2$ oriented with its slow axis parallel to one of the two retarder axes. As noted above, the latter switch arrangement shifts the overall retardance up or down by $\lambda/2$, which must be taken into account during filter design, and when tuning the filter. This correction term of $\lambda/2$ illustrates why the net retardance is described as being approximately given by the sum or difference of the two retardances $R_1$ and $R_2$, and the exact behavior should be determined by mathematical modeling or experiment.

While two types of polarization switches have been described, any arrangement of elements may be used provided that polarization switch switches between two states to cause an overall effect which is comparable to that of a retarder of approximately $R_1+R_2$ or to that of a retarder of approximately $R_1-R_2$.

In another example, the fast axis of one retarder is parallel to the slow axis of the other retarder, as shown FIG. 1. In this case, the switch action is reversed compared to the case just described.

The switch action of the polarization switch need not be achromatic, although in some embodiments it can be. For example, fixed retarder elements having controlled dispersion can be used to cancel chromatic effects, or fixed retarders can be incorporated in the polarization switch to provide a multi-retarder network, which has a more achromatic action than that of a single element. Further, a polarization switch may be substantially achromatic when operated over a small spectral range, even though the polarization switch might exhibit chromatic effects if operated over a wider spectral range.

When the switch action of the polarization switch is chromatic, the result is that not all wavelengths experience perfect switching between the two states. Typically, either the transmission or extinction is compromised for wavelengths that are substantially different from the switch's optimum wavelength. For some polarization switch designs, such as the variable retarder polarization switch, the optimum wavelength is electrically tunable. This means that the switch action of the polarization switch can be adjusted dynamically based on the action of the system in which the dynamic bandwidth stage is used.

When a dynamic bandwidth stage is incorporated into a larger filter assembly, it is often preferable to tune the switch action of the polarization switch for optimum operation at or near the filter's pass wavelength. However, in some cases it is preferable to optimize the filter's extinction rather than its transmission. In this case, it is be preferable to configure the polarization switch to be most achromatic at some other wavelength than the filter's pass wavelength. For example, the switch action of the polarization switch is optimized at a wavelength near to the wavelength for which extinction is most critical.

For some filter designs, one switch setting is less chromatic than the other is. This is true of the arrangement shown in FIG. 1, for which the broad FSR setting corresponds to the less chromatic setting.

Figure 3:
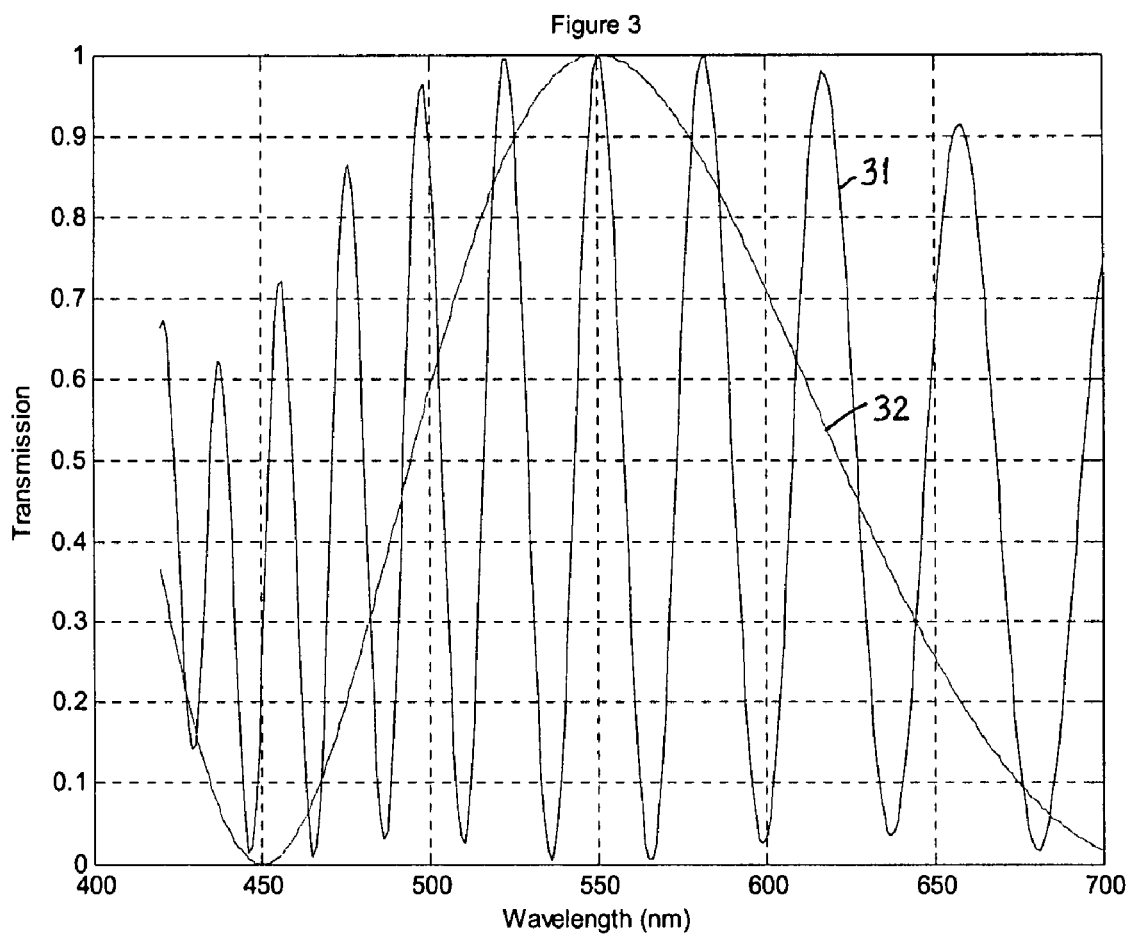
FIG. 3 is an illustrative graph of transmission curves of the single dynamic bandwidth stage shown in FIG. 1 in each of two polarization switch settings.

Referring to FIG. 3, an illustrative graph of transmission curves of the single dynamic bandwidth stage of FIG. 1 in each of its two polarization switch settings is shown. Curve 31 indicates the optical response when the polarization switch 19 acts to select the narrow FSR configuration, and curve 32 indicates the response when the polarization switch 19 acts to select the broad FSR configuration.

It can be seen that the minima of curve 32 extend to zero, whereas the minima of curve 31 do not all reach 0 but instead have a minimum value, which depends somewhat on wavelength. Thus, the extinction produced by the various minima is not uniform across wavelength due to the chromatic action of the retarders 15, 16 and polarization switch 19 arrangement. This configuration offers less chromatic behavior in the broad FSR setting, so that extinction is optimized in the broad FSR setting. However, this could be reversed if a less chromatic action were desired in the narrow FSR setting by inverting the switch action of polarization switch 19 as described above.

Figure 4:
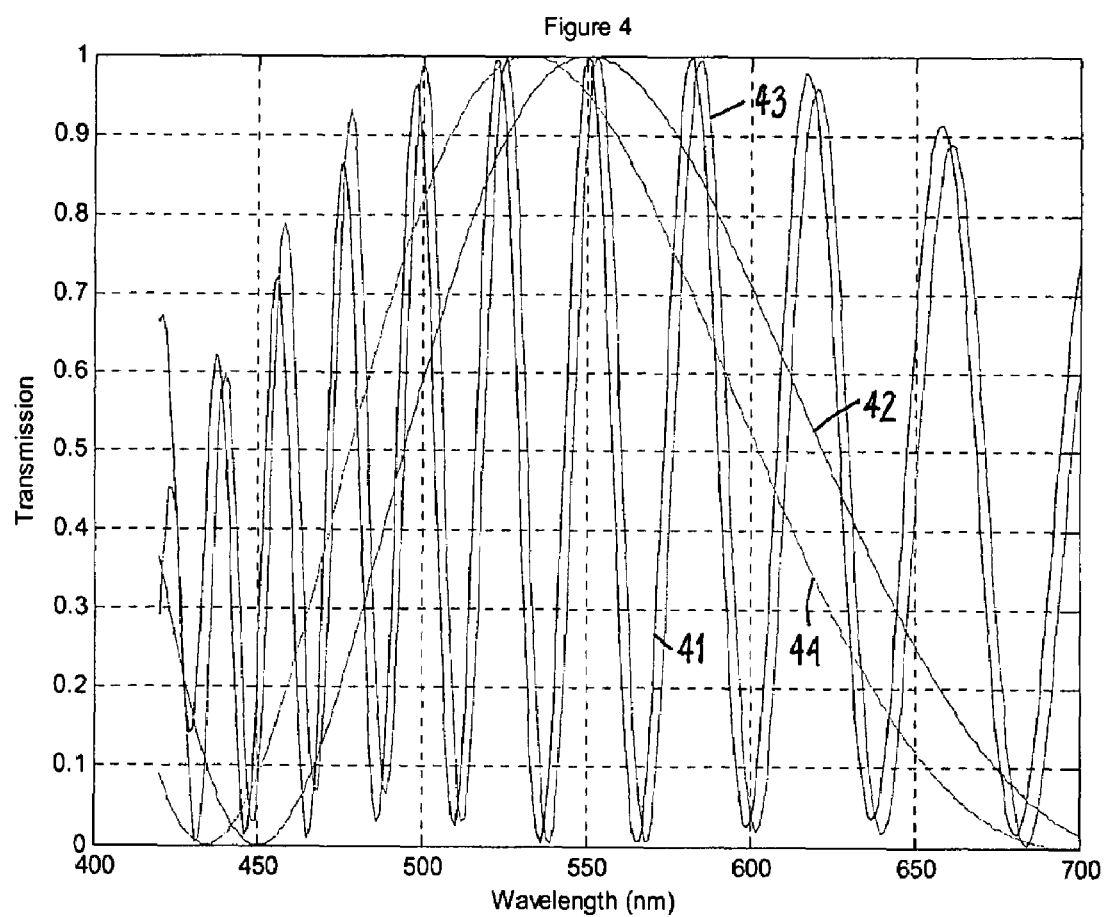
FIG. 4 is an illustrative graph of transmission curves of the single tunable dynamic bandwidth stage shown in FIG. 2 in each of two polarization switch settings.

Referring to FIG. 4, an illustrative graph of transmission curves of the single tunable dynamic bandwidth stage shown in FIG. 2 in each of two polarization switch settings is shown. The curve 41 indicates the optical response when the polarization switch 29 acts to select the lower FSR configuration, and the curve 42 indicates the response when the polarization switch 29 acts to select the higher FSR configuration. The variable retarder 23 is set to zero retardance for these curves. The curves 43 and 44 show the low FSR and high FSR configuration when the filter is tuned to a different pass wavelength. The tuning was effected by tuning the variable retarder 23 to a retardance of 51 nm for these two curves.

There are several ways that the dynamic bandwidth filter stage can be used in an overall filter assembly. In one embodiment, the retardances are chosen so that in its narrow FSR setting, the dynamic bandwidth stage is the spectrally narrowest stage in the overall filter assembly. In this embodiment, the dynamic bandwidth filter stage determines the overall filter FWHM, and the polarization switch acts to choose between a broader and a narrower overall filter action.

It is possible to incorporate two or more dynamic bandwidth stages, which in their narrow FSR setting are narrower than the other elements in the filter. By choosing which of the dynamic stages are broad and which are narrow, it is possible to provide a range of bandwidth choices. For example, a filter may include two dynamic bandwidth stages which are designed so that in their narrow FSR setting, the FWHM of dynamic stage one, FWHM of dynamic stage two, and FWHM of all other filter elements form a ratio of approximately 1:1.4:2.0. This provides three different overall filter bandwidths, depending on whether dynamic stages one and two are both narrow, dynamic stage one is broad and dynamic stage two is narrow or both dynamic stages one and two are broad. Other ratios may be employed, such as 1:2:4, for example. Further, a greater number of dynamic stages can be employed to attain a wider range of bandwidths, or finer discrimination of bandwidth, or both.

Figure 5:
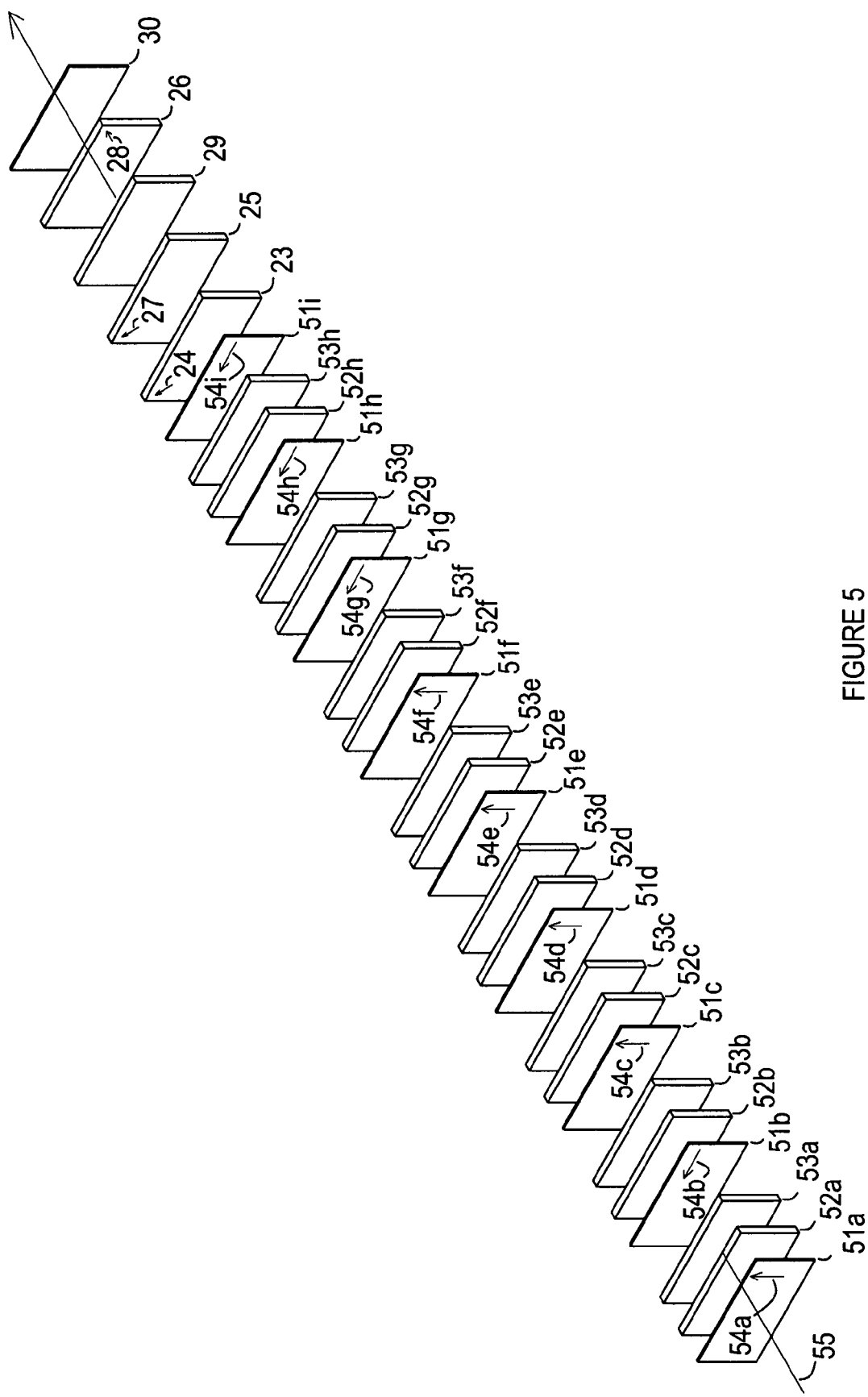
FIG. 5 is an illustrative block diagram of a filter assembly incorporating the tunable dynamic bandwidth stage of FIG. 2, according to one embodiment of the invention.

Referring to FIG. 5, an illustrative block diagram of a filter assembly is shown. It incorporates a first optical filter in series with the tunable dynamic bandwidth stage of FIG. 2.

The first filter includes polarizers 51a-i with transmission axes 54a-i, respectively, fixed retarders 52a-h, and nematic liquid crystal variable retarders 53a-h. The fixed retarders 52a-h include a PVA film with 310 nm retardance, a PVA film with 520 nm retardance, a PVA film with 140 nm retardance, a PVA film with 550 nm retardance, a Mylar film with 780 nm retardance, a Mylar film with 1210 nm retardance, and a 0.500 mm thick quartz retarder having approximately 4500 nm retardance, respectively. Linear polarizers 51a-h are placed at the entrance to each stage, with linear polarizer 51i at the exit of the last of these stages, in a conventional Lyot arrangement. The transmission axes 54a-i are oriented so that the first two retarder stages (52a-b) and the sixth retarder stage (52f) are between crossed polarizers and the third, fourth, fifth, seventh, and eighth retarder stages (52c-e, g, h) are between parallel polarizers. The variable retarders (53c-e, g, h), which are operating between parallel polarizers are adjusted to produce a retardance, together with the associated fixed retarder element (52c-e, g, h), that is an integral number of waves N. The variable retarders (53a, b, f), which are operating between crossed polarizers, are adjusted to produce a retardance, together with the associated fixed retarder element (52a, b, f), that is a half-integral number of wavelengths (N+½) λ at the wavelength λ being transmitted.

This first filter is tunable by adjustment of the voltage applied to the variable retarders, and it provides a bandpass action with good, but imperfect, rejection of out-of-band light.

The dynamic bandwidth stage includes variable retarder 23, fixed retarders 25 and 26, polarization switch 29, and exit polarizer 30.

Figure 6:
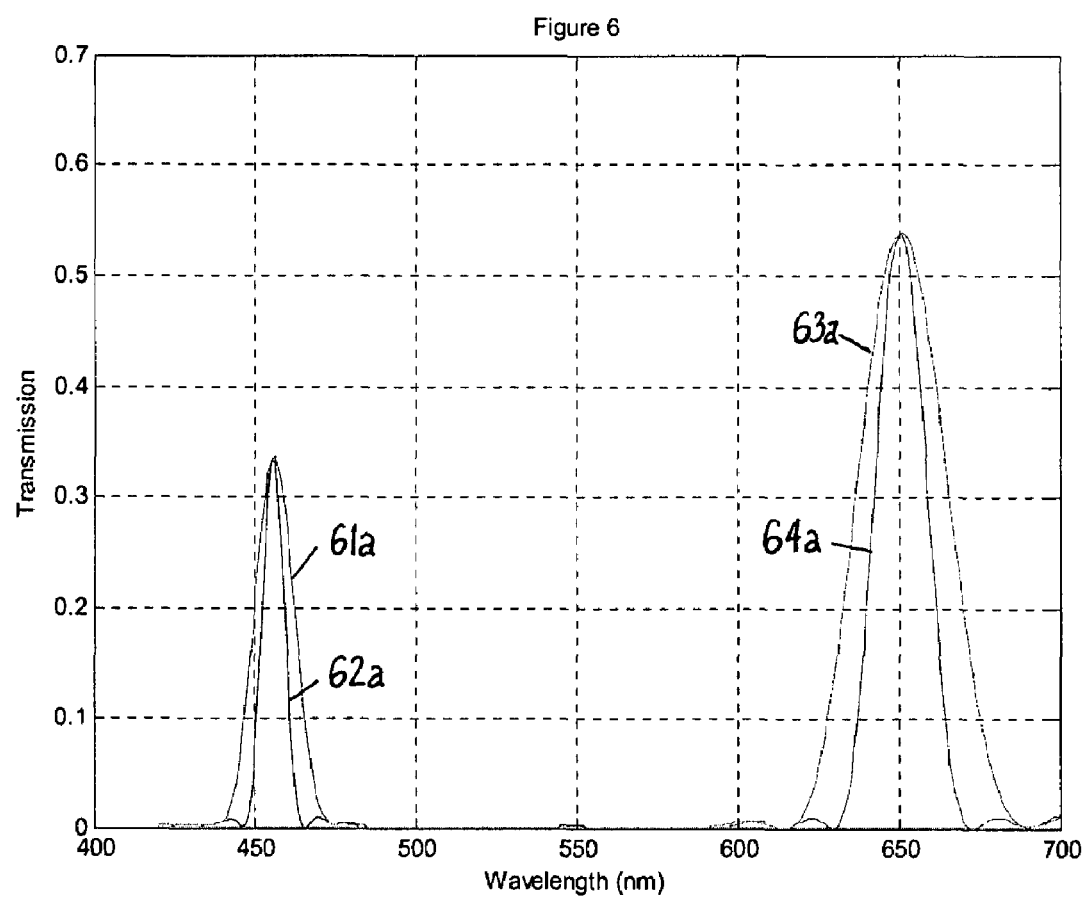
FIG. 6 is an illustrative graph of transmission curves of the filter assembly shown in FIG. 5 in each of two polarization switch settings.

Referring to FIG. 6, an illustrative graph of transmission curves of the filter assembly shown in FIG. 5 in each of two polarization switch settings is shown. Curves 61a and 62a show the transmission when the filter assembly is tuned to 460 nm while the configurable stage is set to its spectrally broad and narrow settings, respectively. Similarly, the curves 63a and 64a show the transmission when the filter assembly is tuned to 650 nm while the configurable stage is set to its spectrally broad and narrow settings, respectively. The overall filter bandwidth is approximately twice as great when the configurable stage is set to its broad setting as when it is in its narrow setting.

Figure 7:
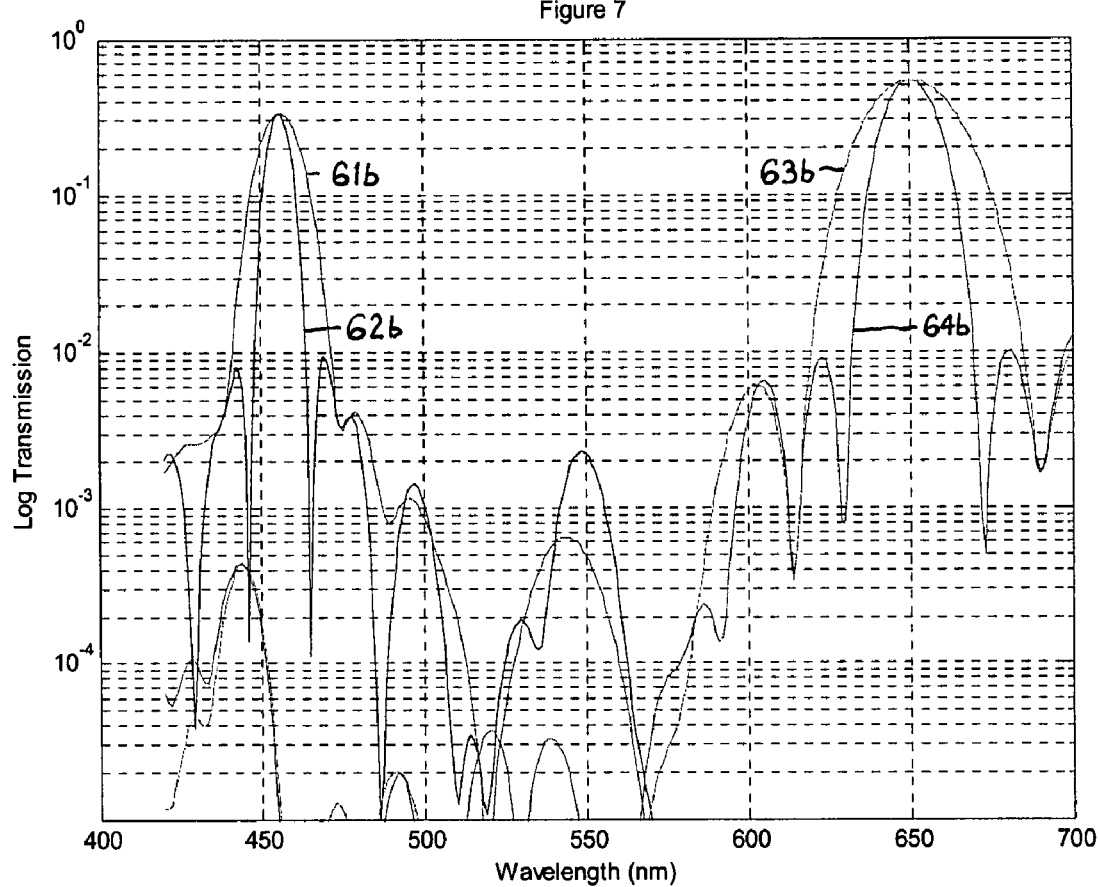
FIG. 7 is an illustrative graph of optical density curves of the filter assembly shown in FIG. 5 in each of two polarization switch settings.

Referring to FIG. 7, an illustrative graph of optical density curves of the filter assembly shown in FIG. 5 in each of two polarization switch settings is shown. The transmission curves 61b and 62b show the optical density of the filter assembly when it is tuned to 460 nm and the configurable stage is set to its spectrally broad and narrow settings, respectively. Similarly, the curves 63b and 64b show the optical density of the filter assembly when it is tuned to 650 nm while the configurable stage is set to its spectrally broad and narrow settings, respectively.

In another embodiment, a filter includes a dynamic bandwidth stage in which the retarders are chosen so that in its narrow setting, the dynamic bandwidth stage is better at enhancing the overall filter extinction or out-of-band blocking when the filter is tuned within a certain portion of the spectrum. However, in its broad setting, the dynamic bandwidth stage is better at enhancing the overall filter extinction or out-of-band blocking when the filter is tuned within a different portion of the spectrum. In this embodiment, the dynamic filter stage enhances the filter's out-of-band blocking by selecting between the two configurations, depending on what wavelength is being transmitted. In general, the filter designer may choose $R_1$ and $R_2$ independently, so their sum and difference can each be tailored to meet the task.

In yet another embodiment, both the objectives of dynamic bandwidth and of enhanced blocking may be met. In the narrow FSR setting, the overall filter FWHM is reduced and a finer spectral response is attained. However, in the broad FSR setting, the overall FWHM increases and the overall filter extinction or out-of-band blocking is enhanced.

In another embodiment, a filter assembly includes a dynamic bandwidth stage, which is set to its broad FSR setting when the filter as a whole is tuned to short wavelengths, and it is set to its narrow FSR setting when the filter is tuned to longer wavelengths. The dynamic bandwidth stage is designed so its FWHM is lower than the rest of the filter stages and determines the overall assembly FWHM when the dynamic bandwidth stage is in its narrow FSR setting. The FWHM of this filter assembly is reduced at longer wavelengths, compared to a filter that does not have a dynamic bandwidth stage. This configuration can be useful since the FWHM of a birefringent filter increases when it is tuned to longer wavelengths. The FWHM is constant in wave numbers, except for dispersion effects. The conversion from wave numbers to wavelength is proportional to $\lambda^2$, so the FWHM in wavelength terms is inherently higher at longer wavelengths. This leads to a disparity in signal levels as the filter is tuned across its range. In the immediately previous example, the dynamic bandwidth stage produces an overall filter in which this effect is less pronounced.

As noted earlier, overall filter extinction or out-of-band blocking can be enhanced by suitable choice of the retarder values to obtain a desired response in the broad setting. The best value will depend on the filter design, and may be optimized by use of Jones calculus models. However, it is often desirable to provide for a broad FSR setting response that blocks red light when tuned to blue wavelengths. Thus, when the filter is tuned to short wavelengths, its extinction is improved compared to a filter that does not have this dynamic bandwidth stage. This can be valuable because many light sources are dominant in red and near-infrared light, but offer little blue or violet light.

Operating the filter with a larger FWHM and enhanced blocking when tuned to the blue is favorable because it provides more of the scarce blue light while effectively blocking the abundant red light. Operating the filter with a smaller FWHM when tuned to the red is favorable because it reduces the total light flux. It is not essential that such a filter provide enhanced blocking of blue light in the narrow FSR setting if the out-of-band blocking is less effective when tuned to the red.

In other embodiments, one or more dynamic bandwidth stages can be combined with one or more Lyot stages to produce an overall filter having a desired set of bandwidth and extinction properties for a given problem. Similarly, one or more dynamic bandwidth stages may be combined with one or more Solc stages. Further, one or more such stages can be combined with one or more stages having generalized birefringence filter design, or with tunable versions of these filters such as those used in the Nuance multi-spectral imaging system sold by CRI, Inc. (Woburn, Mass.).

Moreover, dynamic bandwidth stages can be used in filters that combine one or more of these types of filter stages, such as filters that combine one or more Lyot, Solc, or generalized birefringence filter stages to produce an overall filter which has a configurable FWHM, or which has configurable out-of-band blocking properties.

Figure 8:
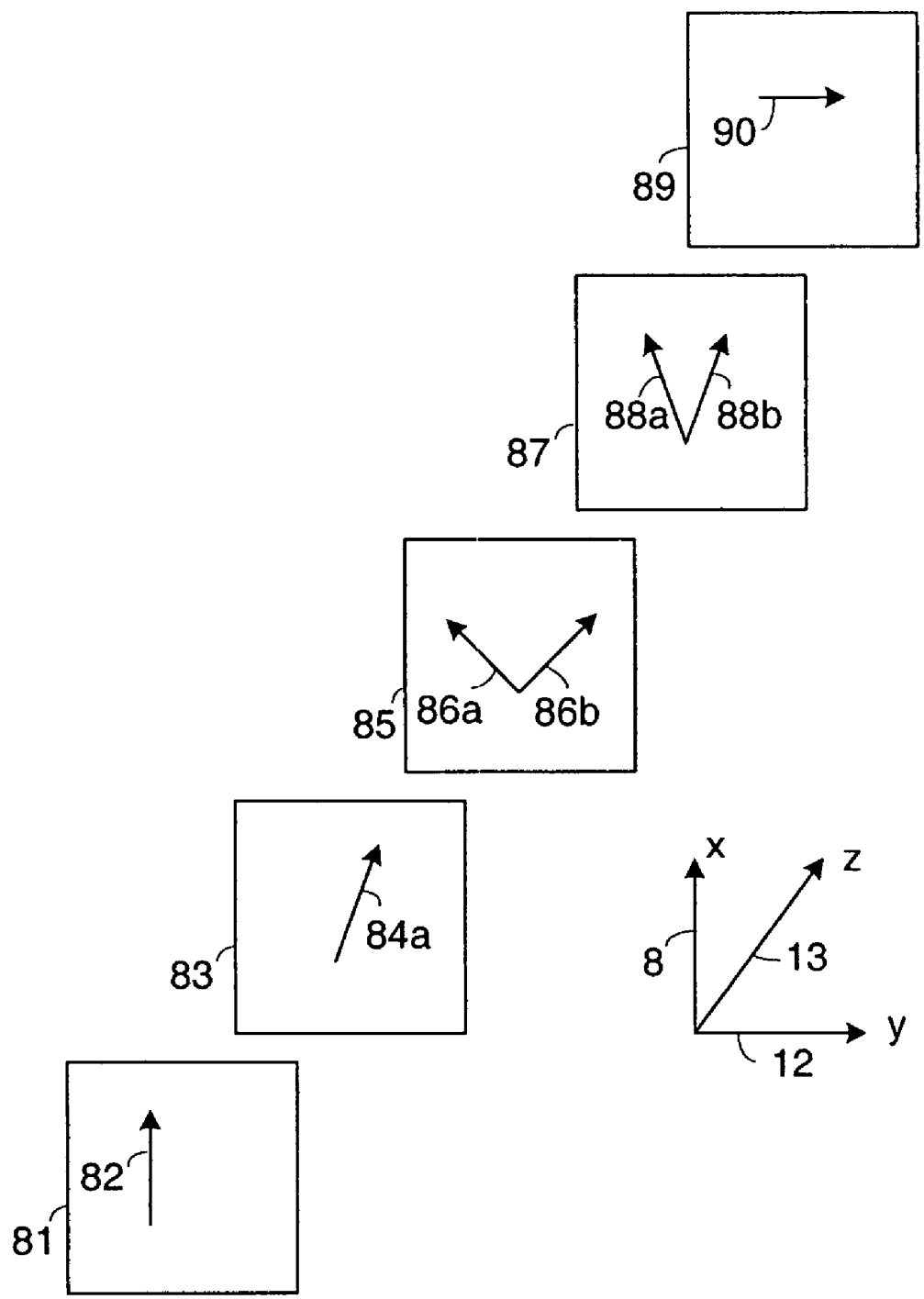
FIG. 8 is an illustrative block diagram of an absentee stage which can be used to achieve a dynamic bandwidth filter in accordance with this invention.

FIG. 8 shows an alternative embodiment of a dynamic bandwidth stage which may be used to practice the present invention. Incident light is polarized by polarizer 81 along axis depicted as 82. When the dynamic bandwidth stage is part of a multistage filter, as is often the case, the light is polarized by the previous stage and element 81 is redundant or may be omitted. Polarization switches 83 and 87 surround a retarder 85 with eigenstates 86a and 86b, the slow and fast axes of propagation, respectively. In this illustrative example, switch 83 is a variable retarder such as a nematic liquid crystal cell, with a slow axis 84a and a retardance that is electrically adjustable, preferably over a range of 0 to $\lambda/2$, or alternatively over the range $N\lambda$ to $(M+\frac{1}{2})\lambda$, where N and M are nonnegative integers. Axis 84a is at approximately 67.5 degrees, and slow axis 86b is approximately 45 degrees. Unless otherwise noted, all angles are measured counter-clockwise, relative to the horizontal. Polarization switch 87 is another variable retarder with a slow axis 88a of approximately 112.5 degrees and a retardance that is electrically adjustable and includes $0-\lambda/2$, or alternatively $N\lambda$ and $(M+\frac{1}{2})\lambda$, for integral N and M.

As is known in the art of polarized light optics, polarized light encountering a half-wave plate has its axis rotated by $2\theta$, where $\theta$ is the angle between the incident polarization axis and the slow axis of the wave plate. Hence, light linearly polarized along axis 82 at an angle of 90 degrees encounters slow axis 84 at 67.5 degrees, so when retarder 83 is a half-wave plate, the incident polarization axis is rotated by an angle $2\theta=-45$ degrees, to lie substantially along axis 86b at an angle of 45 degrees, which is an eigenstate of retarder 85. However, when switch 83 is set to a retardance of 0 (or $N\lambda$), the polarization state of light is unaltered in passing through it. Thus light is linearly polarized at an angle of 90 degrees when it reaches retarder 85, approximately equal components are presented to retarder 85 along axes 86a and 86b.

Summarizing, switch 83 delivers incident light to retarder 85 in one of two polarization states: polarized along axis 86b, or along axis 82. Similarly, switch 87 couples the exit polarization 90 to an axis along 86b when retarder 87 expresses a retardance of $\lambda/2$, or along axis 90 when retarder 87 expresses a retardance of $N\lambda$ or 0.

Operated in concert, when both polarization switches are set to $\lambda/2$, the entrance and exit polarizers are coupled to eigenstate 86b of the retarder, and the stage has no spectral filtering effect. However, when both polarization switches are set to 0 (or $N\lambda$), equal components are presented to both eigenstates of retarder 85, and it operates as a Lyot stage, with a spectral filtering effect that depends on the retardance of element 85.

The above description of FIG. 8 illustrate an example of an absentee stage, and how one may be constructed. Other designs are possible, as well. For example, if exit polarizer 89 were rotated 90 degrees, the it would extinguish, rather than transmit, light of all wavelengths when set to the absentee state. However, to accommodate the output polarization rotation, polarization switch 87 may be constructed with its slow axis oriented along 88b rather than 88a. In such an arrangement, switch 87 will rotate the polarization of light from an axis of 45 degrees, along 86a, by an angle $2\theta=+45$ degrees to an orientation of 90 degrees, where it would be transmitted. To the extent that the polarization switches are achromatic, the absentee stage transmits light of all wavelengths without filtration. Thus it would operate as a transmissive stage when operated in an absentee state, and would have an overall spectral filtering effect consistent with a Lyot stage when not in an absentee state.

Other types of polarization switches may be substituted for the variable retarder switches shown in the illustrative example above, provided that the overall goal is accomplished, namely, to make the stage an absentee when it is no optical filtering effect is desired or an optical filtering effect when that is desired.

Alternative switches which may be useful for constructing absentee stages include Koester rotators or achromatic half-wave plates, constructed with one or more electrically tunable retarder elements, and twisted nematic liquid crystal cells which introduce a twist of 45 degrees by adiabatic following or by first-minimum. Switches may include nematic liquid crystals, ferroelectric liquid crystal cells, or indeed any element which achieves the goal of switching polarization as required for the task at hand.

Figure 9:
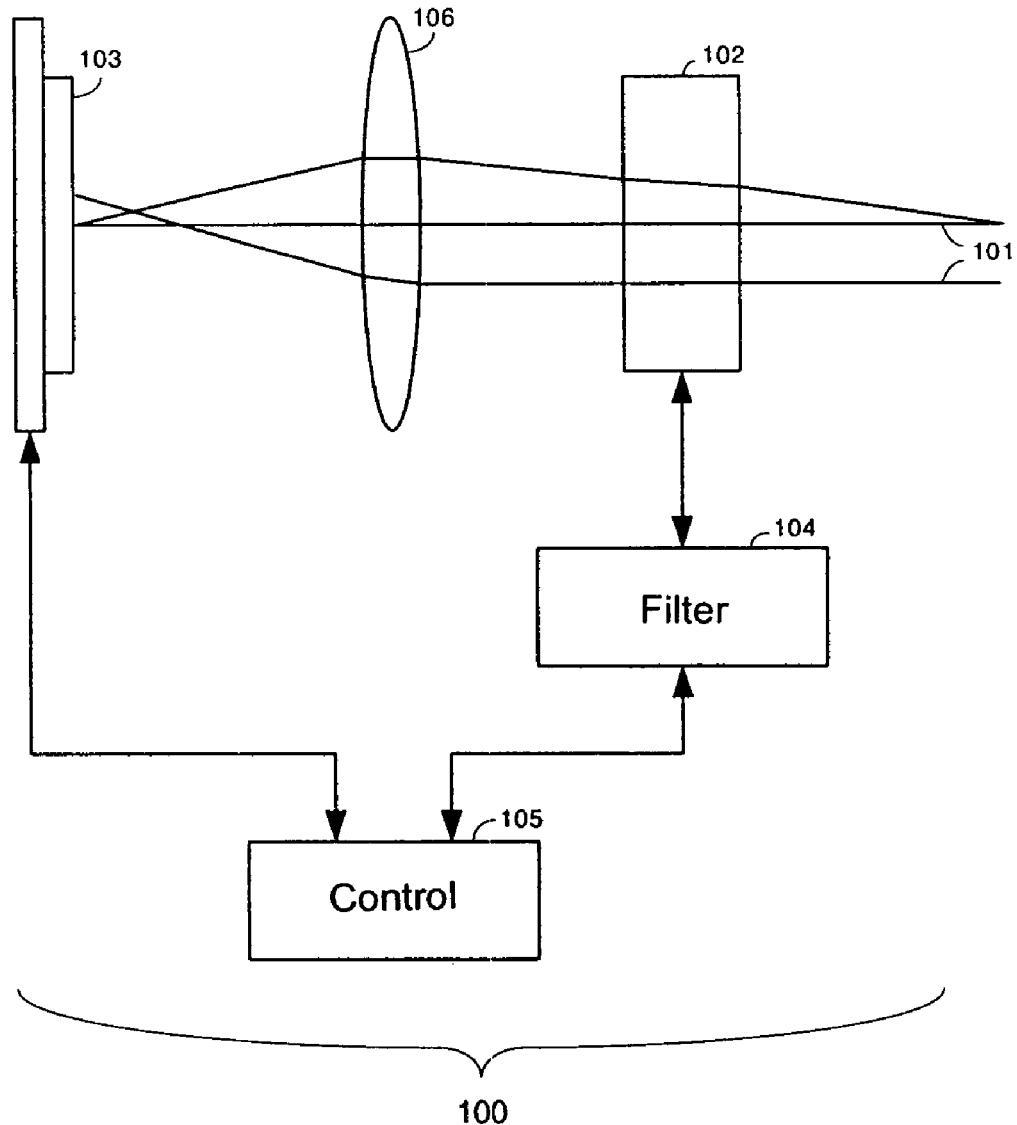
FIG. 9 is a block diagram showing a multispectral imaging system that incorporates a tunable filter incorporating one or more dynamic bandwidth stages, an imaging detector, optional relay optics, filter electronics, and control electronics.

FIG. 9 shows a multispectral imaging system 100 in accordance with the present invention. Light rays 101 enter the system and pass through a birefringent filter 102 which has one or more dynamic bandwidth stages. This filter may be the filter of FIG. 5, or any other tunable filter which provides a desired optical filter action with two or more bandwidth states. The filtered light may pass through optional relay lens 106, and then proceeds to imaging sensor 103. The optional relay lens 106 may be included to provide an overall increase or decrease in the optical magnification of the system, or to relay an image formed elsewhere in an optical system and re-image it at the surface of sensor 103. The optional relay lens 106 may be included for alternative purposes such as image inversion, changing the position or size of pupils or images, or for a combination of these purposes, as is known in the art of optical design.

As a further alternative, the arrangement of the relay lens and the filter may be reversed. That is, the light may first pass through the relay lens and then through the filter. In other cases, a lens may be present on both sides of the filter, where the arrangement produces an overall optical action. The decision to choose one arrangement over the other may be made on the basis of optical design principles, on ray-tracing models, or on the basis of actual measurements (which may be guided by design principles, ray tracing models, or both), according to the preference of the designer. Suitable programs for optical ray-tracing include Zemax from the Zemax Development Corporation, (Bellevue Wash.). Preferably, the relay lens will be an apochromat type or other design that is chosen to produce low image distortion over the spectral range of the filter. The relay lens may be omitted entirely if it is not required.

Imaging sensor 103 may be a CCD or CMOS camera. In one preferred embodiment, this is a Retiga EXi camera from QImaging Corporation (Vancouver, BC, Canada). This provides a two-dimensional image of a scene, with spatial resolution of up to 1040×1392 pixels, and communicates with other components or systems via a FireWire interface. In another embodiment, it is a sensor based on the KLI-5001 linear image sensor from the Eastman Kodak Company, Image Sensor Solutions division (Rochester, N.Y.). This produces a 1-D image of a linear portion of a scene, with 5000×1 resolution. In another embodiment, the sensor 103 is an infrared sensor made of InGaAs such as the SU320M-1.7RT from Goodrich Corporation (Princeton N.J.), which provides a 2-dimensional image of a scene in the 850-1700 nm spectral range, with spatial resolution 320×240 pixels. It provides digital data on an EIA-422 interface.

Filter electronics 104 produce electrical signals to tune the filter and to select the bandwidth dynamically. The filter electronics 104 may also sense one or more filter properties, such as its temperature or electrical characteristics. These electronics 104 are in communication the filter, and with control system 105 that coordinates the overall image acquisition and filter tuning. Control system 105 is often a personal computer and associated interface circuits, but it may be a dedicated control system such as a microcontroller, microprocessor, FPGA, or DSP-based system. The choice of one type of control system over another may be made on the basis of factors such as cost, miniaturization, power consumption, operating speed, and so on, as are known in the electrical engineering art. The communication between the filter electronics 104 and control system 105, or between imaging sensor 103 and control system 105, may be direct, as indicated in FIG. 9 by the interface 105, or may be indirect. For example, filter electronics 104 may include a USB2 hub and the camera interface may pass through this hub, and then to control system 105.

Control system 105 acts to coordinate the filter tuning and the image acquisition. The Nuance software from CRI Inc (Woburn, Mass.) is suitable for this purpose. However, it must also provide controls responsive to user input or selection, which cause the filter electronics 104 to select the desired filter bandwidth. For example, a checkbox may be provided which enables the user to select whether a broad or narrow bandwidth is sought. If more than two choices are available, other controls such as a list box or other selection tool may be provided.

The control system 105 may also provide for acquiring a dataset in which the bandwidth is changed during the dataset. For example, the dataset may include measurements taken at intervals of 20 nm over the range 500-860 nm, with the filter in its spectrally broadest setting when the wavelength is below 700 nm, and in its spectrally narrowest setting for wavelengths of 700 nm and above. This increases the spectral resolution of the system, in nm, for images taken at the long-wavelength portion of the scan, compared to systems of the prior art, by using a narrower bandwidth when tuned to longer wavelengths. At the same time, sensitivity to weak signals is maximized for the short-wavelength images, by using the widest bandwidth—and hence, collecting the most signal energy.

The use of a uniformly-spaced set of wavelengths is not required, if some other wavelength set is preferable. Nor must the dynamic bandwidth selection be engaged only at one end or another of the wavelength range. The electronically-adjustable nature of the system provides for extremely flexible data acquisition. For example, a single band may be taken with a wide bandwidth, and all the others narrow; or the converse; or any combination whatsoever. Furthermore, the wavelengths may be chosen with complete freedom, limited only by the tuning range of the filter and of the optical system.

While examples have been shown that illustrate use of the dynamic bandwidth stage with other birefringent filter stages, one may alternatively combine dynamic bandwidth stage with other types of filters. For example, a dynamic bandwidth stage can be combined with an interference filter that transmits light only within a predefined bandwidth, and the FSR of the dynamic bandwidth stage in its narrow setting is comparable to the bandwidth of the interference filter, and the FSR in the broad setting is substantially wider than that of the interference filter. The result of this configuration is a band-pass filter with a bandwidth that is selectable between that of the interference filter, and that of the narrow setting of the dynamic bandwidth stage. Other examples include the use of dynamic bandwidth stages with interference or color glass filters that produce cut-on, cut-off, and multi-band response.

The present invention is not intended to be limited to single-pixel filter devices. Further, it is possible to construct pixilated versions of the dynamic bandwidth stage. In such a system, the polarization switch may be pixilated, or one or more of the retarders may be pixilated, or wedged across its surface, or both. In the latter case, the values of $R_1$ and $R_2$ depend upon position across the face of these two elements, according to the wedge or pixilation scheme that is used.

Reflective versions of the filter assembly are also possible. In one aspect, the entire stage is incorporated and is traversed twice, in a forward direction and a reverse direction. In another embodiment, the mirror is adjacent to the polarization switch and one of the retarders is omitted. Also in the latter embodiment, the switch is constructed with half thickness. Any switch may be employed which is symmetric about an imaginary plane at its middle. In this case, only the elements to one side of the symmetry plane are provided adjacent the mirror. The approach where the switch itself abuts the mirror is somewhat less versatile since there is only one degree of freedom available when choosing the retarders, rather than two. In effect, there is a single retarder $R_1$, adding, or canceling with itself rather than with a second retarder. The retarder combinations this configuration yields in the narrow and broad configurations are $R_1+R_1$ and $R_1-R_1$, respectively.

Thus, while certain specific embodiments have been shown, various arrangements may be combined to suit the task, and others will be evident to those skilled in the fields of optical design, polarized light analysis, and multi-spectral instrumentation.

Variations, modifications, and other implementations of what is described herein may occur to those of ordinary skill in the art without departing from the spirit and scope of the disclosed subject matter. Further, the various features of the embodiments described herein also can be combined, rearranged, or separated without departing from the spirit and scope of the disclosed subject matter. Accordingly, the invention is not to be defined only by the preceding illustrative description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An optical filter which transmits light in a transmission band surrounding a pass wavelength, the optical filter having a dynamic bandwidth stage comprising the following elements in optical series:
    an entrance face which receives polarized incident light,
    a first optical retarder with optical retardance $R_1$;
    a first polarization switch; and
    an exit polarizer, the polarization switch being switchable between a first state in which the transmission band has a first bandpass width surrounding the pass wavelength, and a second state in which the transmission band has a second bandpass width surrounding the pass wavelength.

2. The optical filter of claim 1, further comprising an optical filter element.

3. The optical filter of claim 2, wherein the optical filter element comprises one or more Lyot stages.

4. The optical filter of claim 2, wherein the optical filter element comprises one or more Solc stages.

5. The optical filter of claim 1, wherein the pass wavelength is tunable.

6. The optical filter of claim 1, wherein the dynamic bandwidth stage further comprises a tuning element, adjacent to the first optical retarder, the tuning element being adjustable to select the pass wavelength.

7. The optical filter of claim 6, further comprising a control circuit in communication with the tuning element and the first polarization switch, the control circuit being configured to adjust the tuning element to maintain the same pass wavelength when the polarization switch state is changed.

8. The optical filter of claim 2, wherein the optical filter element is tunable.

9. The optical filter of claim 6, further comprising an optical filter element, wherein the optical filter element is tunable, and the optical filter element and the tuning element are synchronously tuned to yield a tunable pass wavelength.

10. The optical filter of claim 2, further comprising an extinction of out-of-band light which is affected by the polarization switch state.

11. The optical filter of claim 1, wherein the dynamic bandwidth stage further comprises a second optical retarder with optical retardance $R_2$.

12. The optical filter of claim 11, wherein the first polarization switch is positioned between the first and second optical retarders.

13. The optical filter of claim 12, wherein the first polarization switch causes the retardances $R_1$ and $R_2$ to substantially add in the first switch state and to substantially subtract in the second switch state.

14. The optical filter of claim 1, wherein the dynamic bandwidth stage further comprises a second polarization switch.

15. The optical filter of claim 14, wherein the dynamic bandwidth stage further comprises a second optical retarder.

16. The optical filter of claim 14, wherein the first and second polarization switches surround the first optical retarder.

17. A multispectral imaging system with selectable bandwidth, comprising:
    an imaging sensor which images filtered input light; and
    an optical filter which transmits light in a transmission band surrounding a pass wavelength, the optical filter having a dynamic bandwidth stage comprising the following elements in optical series: an entrance face which receives polarized incident light, a first optical retarder with optical retardance $R_1$; a first polarization switch; and an exit polarizer, the polarization switch being switchable between a first state in which the transmission band has a first bandpass width surrounding the pass wavelength, and a second state in which the transmission band has a second bandpass width surrounding the pass wavelength.

18. The multispectral imaging system of claim 17, further comprising a lens.

19. The multispectral imaging system of claim 18, wherein the said filtered light passes through the lens.

20. The multispectral imaging system of claim 17, wherein the imaging detector comprises a COD or CMOS camera.

21. The multispectral imaging system of claim 17, wherein said optical filter further comprises an optical filter element.

22. The multispectral imaging system of claim 21, wherein the optical filter element is tunable.

23. The multispectral imaging system of claim 22, further comprising a controller configured to tune the optical filter element.

24. The multispectral imaging system of claim 17, wherein the dynamic bandwidth stage further comprises a tuning element, adjacent to the first optical retarder, the tuning element being adjustable to select the pass wavelength.

25. The multispectral imaging system of claim 24, further comprising a control circuit in communication with the tuning element and the polarization switch, the control circuit being configured to adjust the tuning element to maintain the same pass wavelength when the polarization switch state is changed.

* * * * *